US012754783B2

United States Patent

(12) United States Patent
Al-Shehab et al.

(10) Patent No.: US 12,754,783 B2
(45) Date of Patent: Oct. 6, 2026

(54) COMPUTER-BASED SYSTEMS CONFIGURED FOR A CLOUD-FIRST MULTIFUNCTION API CLUSTER PROVIDING MICROSERVICES CAPABLE OF BOTH BATCH AND REAL-TIME PROCESSING AND METHOD AND USE THEREOF

(71) Applicant: Capital One Services, LLC, McLean, VA (US)

(72) Inventors: Ali S. Al-Shehab, Medford, MA (US); Jr-Wei Jeng, Marlboro, NJ (US); Niti N. Sheth, Edison, NJ (US); Tanveer Afzal Faruquie, Scarsdale, NY (US); David Edward Lutz, Tarrytown, NY (US); Nathan L. Sheridan, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/605,606

(22) Filed: Mar. 14, 2024

(65) Prior Publication Data

US 2025/0291649 A1 Sep. 18, 2025

(51) Int. Cl.
*G06F 9/54* (2006.01)
*G06F 16/215* (2019.01)

(52) U.S. Cl.
CPC ............ *G06F 9/541* (2013.01); *G06F 16/215* (2019.01)

(58) Field of Classification Search
None
See application file for complete search history.

(56) References Cited

U.S. PATENT DOCUMENTS

| | | | | |
|---|---|---|---|---|
| 2005/0086224 | A1* | 4/2005 | Franciosa | G06F 16/3334 |
| 2012/0023107 | A1* | 1/2012 | Nachnani | G06F 16/215 707/E17.014 |
| 2015/0227851 | A1 | 8/2015 | Kaisser | |
| 2020/0372075 | A1 | 11/2020 | Rogynskyy et al. | |
| 2024/0154865 | A1* | 5/2024 | Biswas | H04L 67/55 |
| 2025/0278267 | A1* | 9/2025 | Cerny | G06F 8/71 |

OTHER PUBLICATIONS

Kathare et al. A Comprehensive Study of Elastic Search. JRSE 4:11, Nov. 2022. (Year: 2022).*

Evaluating Entity Resolution Results. VLDB 2010, pp. 208-219. (Year: 2010).*

Ragone. Scaling Elasticsearch. Jan. 2017, pp. 1-16. https://medium.com/hipages-engineering/scaling-elasticsearch-b63fa400ee9e. (Year: 2017).*

* cited by examiner

*Primary Examiner* — Stephen S Hong
(74) *Attorney, Agent, or Firm* — GREENBERG TRAURIG, LLP

(57) ABSTRACT

The disclosure is related to computer-based information processing systems configured to resolve entity records in a database. Specifically, the systems and methods utilize natural language models in a cloud-first multifunction API cluster to provide microservices capable of both batch and real-time processing of a large number of entity records.

14 Claims, 6 Drawing Sheets

Data Table 200

| ID (202) | Entity Name (204) | Address (206) | Exec Name (208) | Phone No. (210) |
|---|---|---|---|---|
| 843334 | ABC Company INC | 123 S. Main St., Ashville, NC | John Doe | 7418539630 |
| 830349 | ABC Company | 3310 E US-93, Tampa, FL | John Doe | 7418539630 |
| 843334 | ABC Company INC | 123 S. Main St., Ashville, NC | John Smith | 7418539630 |

212

FIG. 2

COMPUTER-BASED SYSTEMS CONFIGURED FOR A CLOUD-FIRST MULTIFUNCTION API CLUSTER PROVIDING MICROSERVICES CAPABLE OF BOTH BATCH AND REAL-TIME PROCESSING AND METHOD AND USE THEREOF

FIELD OF TECHNOLOGY

The present disclosure generally relates to computer-based systems configured for one or more novel technological applications of entity resolution for efficient dataset reduction.

BACKGROUND OF TECHNOLOGY

Determining data quality in the age of big data is a technically challenging problem. Data is virtually limitless and increasing at an exponential rate. Data can be retrieved from many different sources and depending on the source, the confidence in the quality of the data can be high, or it can be low.

SUMMARY OF DESCRIBED SUBJECT MATTER

In some aspects, the techniques described herein relate to a computer-implemented method including: receiving, by at least one processor, at least one entity records, the at least one entity records stored in an elastic search environment, the at least one entity records associated with at least one candidate entity record; utilizing, by the at least one processor, in real time, a microservice module capable of leveraging a containerization technology in a cloud-first computer-implemented real-time scalable processing cluster to determine a score of a match of each candidate entity pair, each candidate entity pair including: at least 20,000 entity records of the at least one entity records and the at least one candidate entity record; wherein the microservice module monitoring the cloud-first computer-implemented real-time scalable processing cluster is configured to: utilize a cleansing engine to cleanse the at least one candidate entity record; determine a status of a blocking engine, the status representing a processing load associated with the blocking engine; utilize a least one blocking engine to determine potential matches to the at least one candidate entity record from the at least one entity records; utilize at least one feature engine to generate the candidate entity pairs from the at least one candidate entity records and the potential matches; utilize at least one machine learning engine to determine the score of each candidate entity pair; display a score representing the at least one candidate entity record and the potential matches determined by the at least one machine learning engine; and merge the at least one candidate entity record and the potential matches based on the score and a user selection.

In some aspects, the techniques described herein relate to a system including: a non-transient computer memory, storing software instructions; and a least one processor of a first computing devices associated with a user; wherein, then at least one processor executes the software instructions, the first computing device is programmed to: receive, by at least one processor, at least one entity records, the at least one entity records stored in an elastic search environment, the at least one entity records associated with at least one candidate entity record; utilize, by the at least one processor, in real time, a microservice module capable of leveraging a containerization technology in a cloud-first computer-implemented real-time scalable processing cluster to determine a score of a match of each candidate entity pair, each candidate entity pair including: at least 20,000 entity records of the at least one entity records and the at least one candidate entity record; wherein the microservice module monitoring the cloud-first computer-implemented real-time scalable processing cluster is configured to: utilize a cleansing engine to cleanse the at least one candidate entity record; determine a status of a blocking engine, the status representing a processing load associated with the blocking engine; utilize at least one blocking engine to determine potential matches to the at least one candidate entity record from the plurality of entity records; utilize at least one feature engine to generate the candidate entity pairs from the at least one candidate entity records and the potential matches; utilize at least one machine learning engine to determine the score of each candidate entity pair; display a score representing the at least one candidate entity record and the potential matches determined by the at least one machine learning engine; and merge the at least one candidate entity record and the potential matches based on the score and a user selection.

In some aspects, the techniques described herein relate to at least one computer-readable storage medium having encoded thereon software instructions that, when executed by at least one processor, cause the at least one processor to perform steps to: receive, by at least one processor, at least one entity records, the at least one entity records stored in an elastic search environment, the at least one entity records associated with at least one candidate entity record; utilize, by the at least one processor, in real time, a microservice module capable of leveraging a containerization technology in a cloud-first computer-implemented real-time scalable processing cluster to determine a score of a match of each candidate entity pair, each candidate entity pair including: at least 20,000 entity records of the at least one entity records and the at least one candidate entity record; wherein the microservice module monitoring the cloud-first computer-implemented real-time scalable processing cluster is configured to: utilize a cleansing engine to cleanse the at least one candidate entity record; determine a status of a blocking engine, the status representing a processing load associated with the blocking engine; utilize at least one blocking engine to determine potential matches to the at least one candidate entity record from the at least one entity records; utilize at least one feature engine to generate the candidate entity pairs from the at least one candidate entity records and the potential matches; utilize at least one machine learning engine to determine the score of each candidate entity pair; display a score representing the at least one candidate entity record and the potential matches determined by the at least one machine learning engine; and merge the at least one candidate entity record and the potential matches based on the score and a user selection.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIG. 2 depicts a table diagram of an exemplary data table that may be stored on a storage device of an exemplary computer-based microservices module configured for cloud-first multifunction API cluster providing microservices capable of both batch and real-time processing of entity records in accordance with one or more embodiments of the present disclosure.

DETAILED DESCRIPTION

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Current information and data processing systems have no known technique of quickly and efficiently determining data quality in real-time, especially when the data is on the order of 100 million entries. This results in several problems related to information processing systems: (1) over/under utilized resources (2) inefficient handling of data (3) imprecise resolution of data. This disclosure contemplates a system that improves information processing systems by utilizing a cloud-first cluster of multifunction APIs configured by a microservices module, the system having at least one machine learning model capable of automatically scaling the microservices to improve information processing systems processing data records in real-time or in batch processing.

According to some embodiments, as discussed herein, this disclosure contemplates a system that improves information processing systems by utilizing a microservice module capable of leveraging containerized model pipelines such as Kubernetes™ or other containerization technologies in a cloud-first scalable processing cluster having multi-function APIs to resolve entity records utilizing machine learning models both in batch and real-time. The containerized model pipelines may utilize any container orchestration system capable of carrying out the novel features of this disclosure, such as Kubernetes™ among other container orchestration technologies or any combination thereof. The cloud-first scalable multi-function APIs leverage containerized model pipelines to scale e.g., providing microservices APIs based on data available from the containerized model pipelines and/or other similar container orchestration systems and/or information related to the entity record to be resolved or any combination thereof. The system is capable of resolving 20,000 entity records from a database of over 100 million entity records instantaneously. The system increases entity record resolution processing speed by at least two folds, and reduces memory requirements, RAM and local storage by at least a third.

Figure 1:
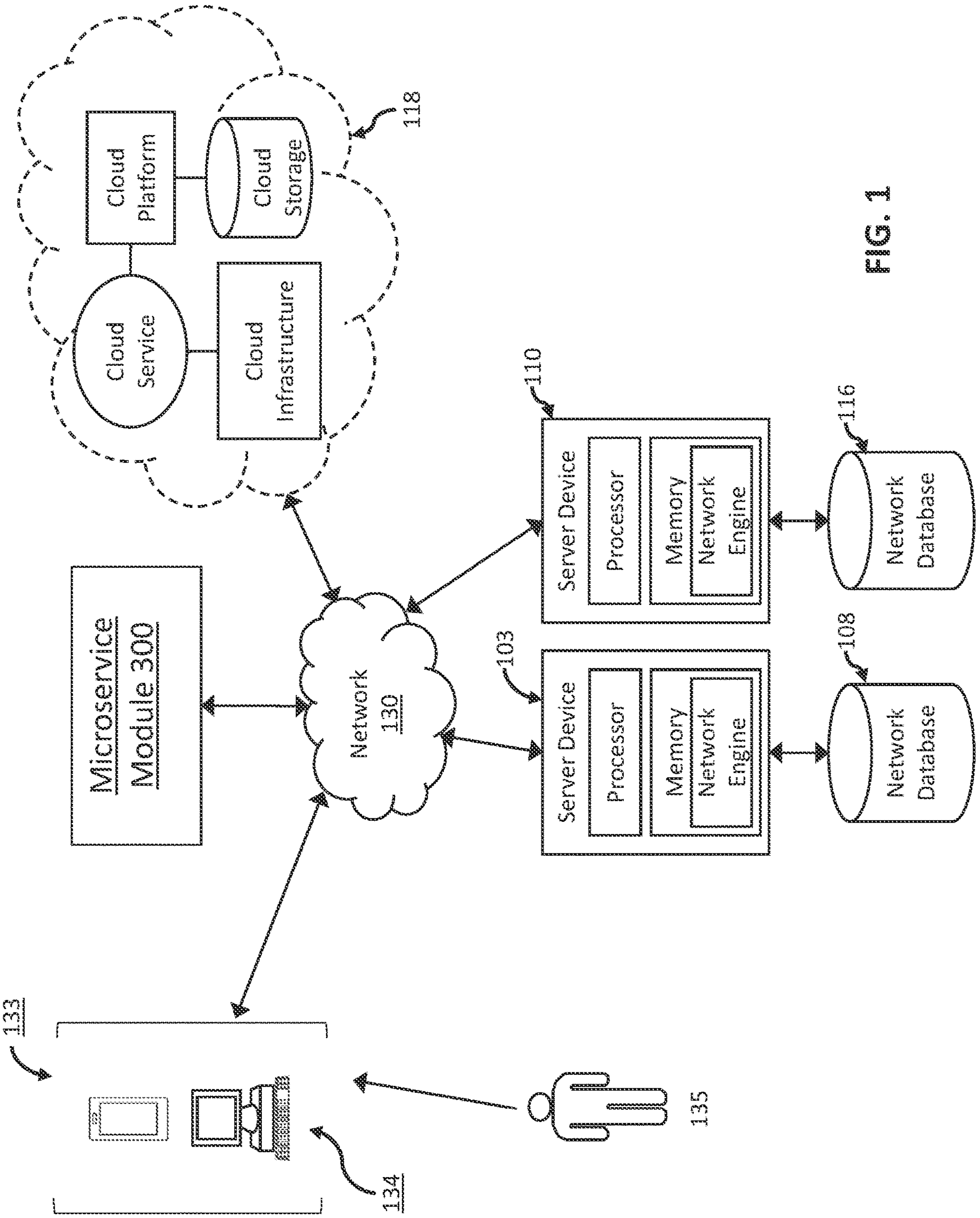
FIG. 1 is a block diagram of an illustrative computer-based system configured for a cloud-first multifunction API cluster providing microservices capable of both batch and real-time processing of entity records in accordance with one or more embodiments of the present disclosure.

FIG. 1 is a block diagram of an illustrative computer-based system configured for a cloud-first multifunction API cluster providing microservices capable of both batch and real-time processing of entity records in accordance with one or more embodiments of the present disclosure. By way of background, entity record resolution in a big database is a technical challenge. For example, resolving a group of entity records that have duplicates and errors from a database that stores thousands, tens of thousands, hundreds of thousands, millions, tens of millions, hundreds of millions, etc. such as over 100 million entity records utilizing a fuzzy search takes approximately 10 minutes. The advent of containerization technologies and other containerization technologies that allow program monitoring, automated deployment and other features, combined with advancements in machine learning models has outmoded past systems and methods for resolving entity records.

According to some embodiments, and as illustrated in FIG. 1 the process of resolving a candidate entity record from a large database of entity records can be separated into distinct parts. In some embodiments an illustrative microservice module 300 leveraging for example a containerization technology to scale APIs in a cloud-first environment is capable of processing at least 20,000 entity records in real-time from a database of hundreds, thousands, tens of thousands, hundreds of thousands, millions, tens of millions, or hundreds of millions of entity records. In some embodiments the illustrative microservice module 300 may utilize information available from a containerization technology to scale e.g., microservices such as APIs, programs, data transfer systems, storage systems, engine(s), module(s), node(s), and database systems in the system. For the purposes of this disclosure the information of a containerization technology may be considered as a system status by which operations of the illustrative microservice module 300 may be configured and/or reconfigured in a manner as to optimize the information processing system processing entity records. In some embodiments the illustrative microservice module 300 may utilize system status of configuration data of the cluster, internal and/or external interfaces (e.g., API server), node resource tracking (e.g., scheduler), reconciliation loop resource management (e.g., controller), container management (e.g., Kubelet™), traffic routing (e.g., Kube-Proxy™), application level (e.g., container), management of at least one container (e.g., Kubernetes™ service), management of sensitive data (e.g., ConfigMaps and secrets), instance state management (e.g., Stateful sets), container replication, and management of replication (e.g., ReplicaSet and deployments), attach keys, sector labels (e.g., Labels and selectors), DNS server (e.g., DNS), web-based UI (e.g., Web UI), metric monitoring (e.g., Container Resource Monitoring), application monitoring (e.g., Container Cost Monitoring), container logging (e.g., Cluster-level logging), or any similar technology in any combination thereof.

In some embodiments, the illustrative microservice module 300 leverages the modularity, scalability, integration capabilities, and parallelization properties of the containerized model pipelines to increase the efficiency of the information processing system processing entity records. In some embodiments the illustrative microservices module 300 may utilize the modularity of the containerized model pipelines by independently verifying datasets handled by at least two independently trained entity engines in containers. For example, in some embodiments process optimization may be carried out as follows, the illustrative microservice module 300 may verify the accuracy of each of the independently trained entity engine 320 by a known data set depending on a system status such as in the case where each entity engine received the same number of entity records to resolve, but one of the containerized models processes entity records more efficiently than the other. In the case where the model of the entity engine 320 is determined to process entity records faster and more accurately the illustrative microservice module 300 operating in a modular environment is capable of scaling, and/or instantiating a new microservice duplicating the connections and weights of the entity engine 320 model. The illustrative microservice module 300 may in turn shut down the other containerized model pipeline node(s) that were processing entity records with the inefficient model. This optimization of information processing systems is not possible within monolithic architecture of typical systems. The containerized model pipeline allows independent model testing and verification, it is resilient to architecture erosion, reduces processing times by eliminating models with inaccurate parameters quickly and efficiently, reduces bandwidth constraints on data transfer systems as containers can operate on node(s) that are not co-located.

Accordingly, in some embodiments, the illustrative microservice module 300 may receive at least one candidate entity record 212 to resolve entity records from a large database of entity records stored in a storage device 301. In some embodiments, the illustrative microservice module 300 may receive a candidate entity record and potential matches of entity records from a network 130, a cloud platform 118, a network database 108 communicatively coupled to a server device 103, a server device 110, a network database 108, a network database 116 communicatively coupled to the server device 110, a mobile computing device 133, a personal computing device 134 or any other similar computing device capable of resolving entity records and accessible by a user 135. In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

FIG. 2 depicts a table diagram of an exemplary data table having entity records that may be stored on a storage device of an exemplary computer-based microservices module 300 configured for cloud-first multifunction API cluster providing microservices capable of both batch and real-time processing of entity records in accordance with one or more embodiments of the present disclosure.

In some embodiments, and as shown in FIG. 2 entity records received by the illustrative microservice module 300 may have at least one candidate entity record 212 in the form of a row in a data table 200. In some embodiments, the entity record entry may have information that corresponds to information about an entity and for example it may include any combination of an ID 202 (e.g., identifier), an entity name 204, an entity address 206, an executive name 208, a phone number 210 or any similar numeric character or text character that may be information related to an entity record. In some embodiments the information may include descriptive text that describes at least a part of at least one entity record associated with a candidate entity record 212. The descriptive text may be automatically generated by analysis of multiple entity records such as for example at least one machine learning model, a classifier, or any similar type of measure capable of determining characteristics of an entity record that optimizes the processing of entity records. In some embodiments the ID 202 of the entity record 212 may be generated by the at least one processor(s) 309 of the illustrative microservice module 300 and may represent a generated feature vector of an entry such as for example the addresses in the column address 206. In some embodiments the ID 202 of the candidate entity record 212 may be generated by an entry generated by a classifier (e.g., classification neural network) or any similar type of transformation method that enables a standardized identifier to enable comparisons of entity record entries by for example, Heuristic matching algorithms, blocking algorithms, deep learning natural language algorithms, distance metrics or any similar type of measure or any combination thereof. In some embodiments the data table 200 may have multiple entries and may be indexed in a format compatible with an elastic search environment.

Figure 3:
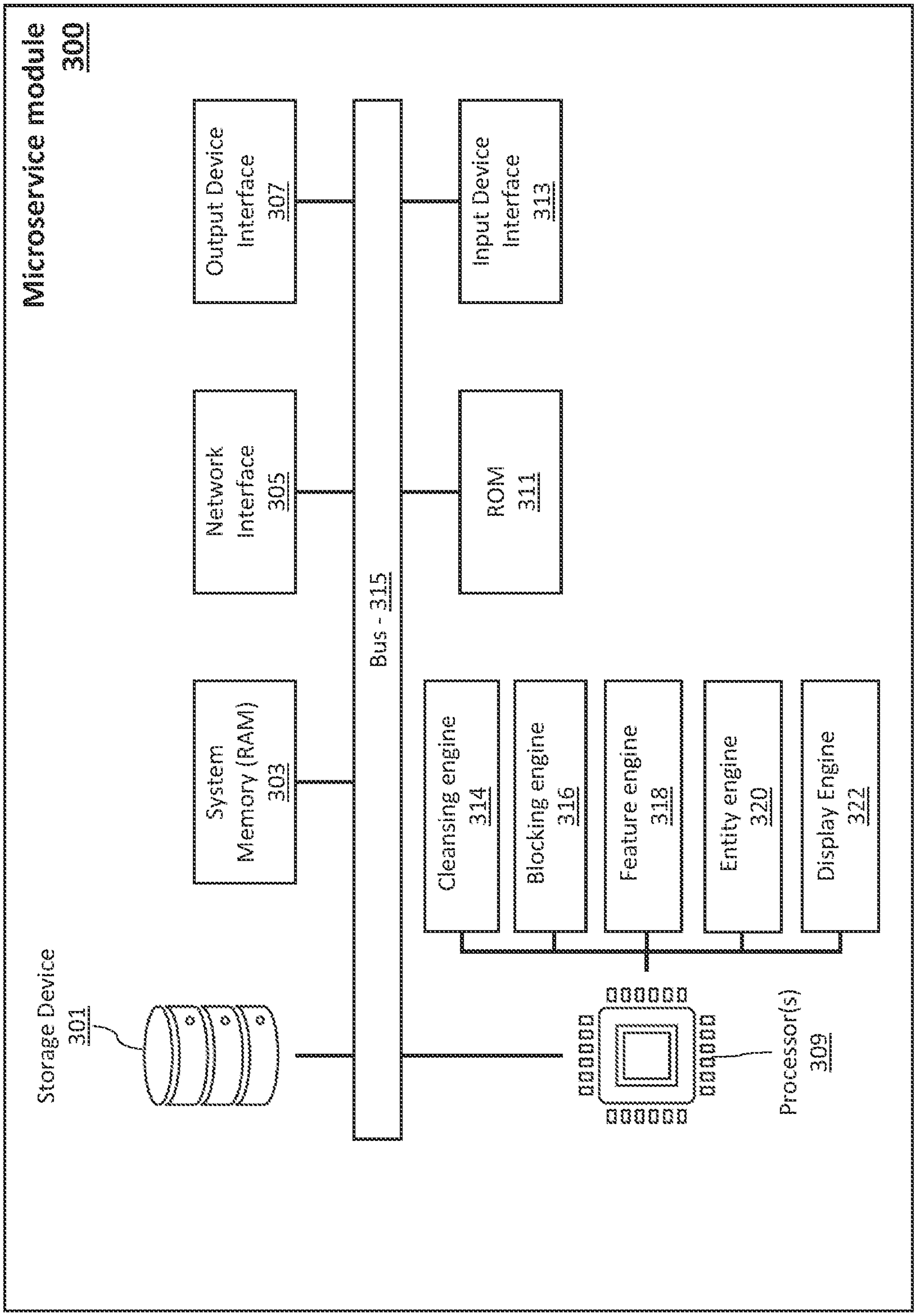
FIG. 3 depicts a block diagram of an exemplary computer-based microservices module configured for cloud-first multifunction API cluster providing microservices capable of both batch and real-time processing of entity records in accordance with one or more embodiments of the present disclosure.

FIG. 3 depicts a block diagram of an exemplary computer-based microservices module 300 configured for cloud-first multifunction API cluster providing microservices capable of both batch and real-time processing of entity records in accordance with one or more embodiments of the present disclosure.

In some embodiments the illustrative microservices module 300 may be configured with a communication bus 315, the bus 315 may be communicatively coupled with at least one processor(s) 309, at least one storage device 301, at least one system memory (RAM) 303 at least one read only memory (ROM) 311, at least one network interface 305, at least one output device interface 307 (e.g., monitor, printer) a least one input device interface 313 (e.g., mouse, keyboard) whereby a user 124 may interact with the system.

In some embodiments the illustrative microservices module 300 includes a computing system having multiple components interconnect through, e.g., a communication bus 315. In some embodiments, the communication bus 315 may be a physical interface for interconnecting the various components, however in some embodiments, the communication bus 315 may be a network interface, router, switch, or other communication interface.

In some embodiments the illustrative microservices module 300 may receive at least one entity record associated with at least one candidate entity records 212, the at least one entity records corresponding to a respective candidate entity record 212.

In some embodiments the illustrative microservice module 300 may utilize a cleansing engine 314 in a pre-processing step to cleanse and aggregate at least one candidate entity record 212 and a group of entity records such as in data table 200 received from a storage device 301. In some embodiments the microservice module 300 may determine to instantiate at least one second cleansing engine in the case where information available from a system status exceeds a pre-determined threshold. In some embodiments the pre-determined threshold may indicate that the entity records to be cleansed require a significant resource allocation. In some embodiments the cleansing engine 314 may utilize a rule to detect the entity records associated with the at least one candidate entity record 212. The rule may be based on an attribute of a feature vector of the entity records such as for example an exact match of feature vectors, or a similar match of feature vectors determined by a threshold of a similarity measure such as a distance measure including, Euclidean distance, Hamming distance, or any combination thereof.

In some embodiments the cleansing engine 314 may utilize the at least one processor(s) 309 to detect and remove duplicate entity records that match the candidate entity record 212. In some embodiments, the cleansing engine 314 may generate a data table 200 with columns for, e.g., the cleansed name, cleansed zip code, cleansed city, state, or other fields and combinations thereof to construct a row for each cleansed record. The columns of each row may be used to generate a cleansed identifier (ID) by, e.g., forming a character string of the data of each column. Records may then be aggregated by, e.g., summing associated quantities, increasing a count number, or other aggregation technique, to combine duplicated cleansed IDs and reduce the number of records. In some embodiments the illustrative microservice module 300 may utilize the cleansed entity records to perform the resolution of the entity records.

In some embodiments the illustrative microservices module 300 may utilize a blocking engine 316. In some embodiments, a blocking engine 316 receives the pre-processed candidate entity records and the associated entity records. In some embodiments, the blocking engine 316 may include, e.g., a memory having instructions stored thereon, as well as, e.g., a buffer to load data and instructions for processing, a communication interface, a controller, among other hardware. A combination of software and hardware may then be implemented by the blocking engine 316 in conjunction with the processor(s) 309 or a processor dedicated to the blocking engine 316 to implement the instructions stored in the memory of the blocking engine 316.

In some embodiments the illustrative microservice module 300 may utilize the blocking engine 316 to receive the pre-processed entity records and perform a search to determine at least one match of the at least one candidate entity records 212 from the database of entity records stored in a storage device 301. The illustrative microservice module 300 may utilize a heuristic search to determine potential matches, the search based on characteristics of the candidate entity record compared to the entity records in the storage device 301. The illustrative microservice module 300 may utilize a minhash algorithm and/or other suitable blocking techniques or combinations thereof to determine at least one match of the pre-processed candidate entity records from the pre-processed entity records.

In some embodiments, the illustrative microservice module 300 may utilize information (e.g., system status) from the containerization technology to determine a status of the at least one blocking engine 316. In some embodiments the status of the blocking engine 316 is related to the capacity of the node(s) on which the at least one blocking engine 316 is operating, the node(s) may have virtual and/or physical computing elements such as at least one processor(s) 309 capacity, memory capacity, data transfer capacity, and/or other similarly related computing capacities. In some embodiments, the illustrative microservices module 300 may instantiate at least one second blocking engine in the case where the system status of the at least one blocking engine 316 is near a capacity of at least one of the elements of node(s) on which the at least one blocking engine 316 is operating. In some embodiments, the illustrative microservice module 300 may utilize any system status information from a containerization technology to instantiate at least one second blocking engine. In some examples, the illustrative microservices module may utilize a threshold to determine an instantiation of at least one second blocking engine based on the number of entity records pre-processed by the cleansing engine 314. In some embodiments in the case where the number of pre-processed entity records exceeds a threshold of 20,000 entity records, cleansing engine 314 may be configured to split the pre-processed entity records into at least two data tables and each data table may be processed independently by the at least one blocking engine 316 and the at least one second blocking engine. In some embodiments the cleansing engine 314 of the illustrative microservices module 300 is not limited to splitting the data into two tables, but may split the data into multiple tables, and instantiate multiple blocking engines for processing. In some embodiments a threshold of pre-processed entity records may be set at 1,000, 2,000, 4,000, 8,000, 16,000, entity records or may be set in a range of 1,000 to 4,000, 4,001 to 8,000, or 8,000 to 16,000 entity records the cleansing engine 314 may be configured to split the pre-processed entity records into at least two data tables and each data table may be processed independently by the at least one blocking engine 316 and the at least one second blocking engine. In some embodiments the cleansing engine 314 may be configured to split the pre-processed entity records when a threshold of the number of pre-processed entity records is set at any one of 1 million, 2 million, 5 million, 10 million, 50 million, or 100 million entity records. In some embodiments the threshold may be set in a range of 1 to 100 million entity records.

In some embodiments the illustrative microservices module 300 may receive system status information from a containerization technology in regard to a node(s) capacity of the at least one blocking engine 316. In some embodiments the illustrative microservices module 300 may instantiate at least one second blocking engine upon receipt of a system status of a blocking engine 316 node(s) exceeds a pre-determined threshold, the threshold set at or near 70%, 75%, 80%, 85%, 90%, 95%, 100% or in a range of 70-100% capacity. In some embodiments, the illustrative microservice module 300 may utilize system status information such as (e.g., etc.) internal and/or external interfaces (e.g., API server), node resource tracking (e.g., scheduler), reconciliation loop resource management (e.g., controller), container management (e.g., Kubelet™), traffic routing (e.g., Kube-Proxy™), application level (e.g., container), management of at least one container (e.g., Kubernetes™ service), management of sensitive data (e.g., ConfigMaps and secrets), instance state management (e.g., Stateful sets), container replication, and management of replication (e.g., ReplicaSet and deployments), attach keys, sector labels (e.g., Labels and selectors), DNS server (e.g., DNS), web-based UI (e.g., Web UI), metric monitoring (e.g., Container Resource Monitoring), application monitoring (e.g., Container Cost Monitoring), container logging (e.g., Cluster-level logging), and/or any similar information from a containerization technology to instantiate an additional microservice on any type of system status information from a containerization technology. In some embodiments this novel approach allows large scale entity record resolution of a database of over 100 million entity records in real-time. Typically, in most information processing systems that process entity records, the blocking process is the most resource intense program and prior to leveraging container orchestration, and the programming systems managing the container orchestration systems, the information processing systems were not capable of resolving entity records in a large database in real-time or batch processing.

In some embodiments the illustrative microservices module 300 may utilize at least one feature engine 318 to generate candidate entity pairs from at least one entity records associated with the at least one candidate entity record 212. In some embodiments the illustrative microservices module 300 may generate candidate entity pairs from the pre-processed entity records, or it may generate candidate entity pairs from the entity records stored in a storage device 301. In some embodiments the illustrative microservices module 300 may generate at least one pair of feature vectors of the at least one candidate entity records 212 and the at least one entity records so that an entity engine 320 can determine a score of the at least one pair of feature vectors of the candidate entity record and the entity records. The at least one feature engine 318 may determine a quantitative representation of a similarity between a pair of feature vectors of the at least one candidate entity record 212 and at least one feature among the entity records. The at least one feature engine 318 may utilize a n-gram similarity measure, a Jaro-Winkler distance, Levenshtein or any similar measure or combination thereof. The at least one feature engine 318 may generate a feature vector using, e.g., 2,3,4-character n-gram similarity between, e.g., each entity name, each zip code, each name, etc.

In some embodiments, the illustrative microservices module 300 may utilize at least one entity engine 320. In some embodiments the at least one entity engine 320 may utilize a machine learning model to process natural language and may be based on a deep machine learning architecture. The at least one entity engine 320 may be configured with at least one input layer, at least one hidden layer, and at least one output layer processing the pairs of feature vectors as inputs and by a numerical optimization of the connections and weights of the at least one hidden layer derives an output layer representing embeddings of the pairs of feature vectors of the input of entity records feature vectors. The at least one entity engine 320 is not limited to utilizing a deep machine learning algorithm architecture but may utilize any type of machine learning architecture such as a gradient boost, random forest, naïve bayes, support vector, decision tree, logistic regression, linear regression, or any similar type of architecture capable of determining embeddings of pairs of feature vectors of multiple entity records.

In some embodiments the at least one entity engine 320 of the illustrative microservices module 300 may be configured to determine a score of the pairs of entity records feature vectors in relation to the at least one candidate entity records feature vectors. In some embodiments the score may be determined by a distance measure such as Euclidean, Hamming, and/or Jacquard, or any similar measure may be utilized. In some embodiments, the entity engine 320 employs an entity matching machine learning model, such as, e.g., a gradient boosted machine to determine a score of the pairs of entity records feature vectors in relation to the at least one candidate entity record 212.

In some embodiments the illustrative microservices module 300 may utilize the modularity of the containerized environment to optimize model parameters of the entity engine 320. In some embodiments one instance of the entity engine 320 may be determined to process entity records faster and more accurately than another entity engine based. The illustrative microservices module 300 may determine an instance of the entity engine 320 is optimized when the system status exceeds a pre-determined threshold. In some embodiments the illustrative microservice module 300 operating in a modular environment is capable of scaling, and/or instantiating at least one second entity engine duplicating the connections and weights of the model or updating the parameters of the model based on a pre-determined setting. The illustrative microservice module 300 may in turn shut down the other containerized model pipeline node(s) that were processing entity records with the inefficient machine learning model.

In some embodiments the illustrative microservices module 300 may utilize the at least one processor(s) 309 to determine a merge of the entity records with the at least one candidate entity record 212 based on the scores of the pairs, for example if the scores of the pairs exceed a threshold, then the illustrative microservices module 300 merges the entity records with the candidate entity record 212. In some embodiments the illustrative microservices module 300 may determine a merge of the entity records based on a high similarity threshold for example utilizing a distance measure such as Euclidian distance, hamming distance, Jacquard similarity or any other similar measure.

In some embodiments the illustrative microservices module 300 may utilize the at least one processor(s) 309 to generate clusters of records based on the candidate pairs and associated candidate pair scores that groups records. In some embodiments, a pre-determined rule determines a best match score threshold for the clusters of records, the pre-determined rule may be based on a correlation between scores of the entity record pairs, and/or it may be based on a correlation of a distance metric within each cluster. In some embodiments, the best match score threshold is pre-determined, however, it may alternatively be user configurable or learned using, e.g., a trained threshold prediction model that, e.g., is trained to regressively predict score thresholds such as for example by a neural network model. In some embodiments, the candidate pair scores relate to a probability of a match. Thus, the higher the score, the greater the probability that the entities of the records are the same entity, such as for example a probability of a range between 70% and 100% may be a high probability of a match, the entity records having a high probability of matching being merged.

In some embodiments the illustrative microservices module 300 may utilize a display engine 322 to display multiple merged candidate entity records and associated information such as statistics, attributes of at least one candidate entity record and the potential matches of entity records based on a score and user selection confidence intervals associated with multiple candidate entity records and the like.

Figure 4:
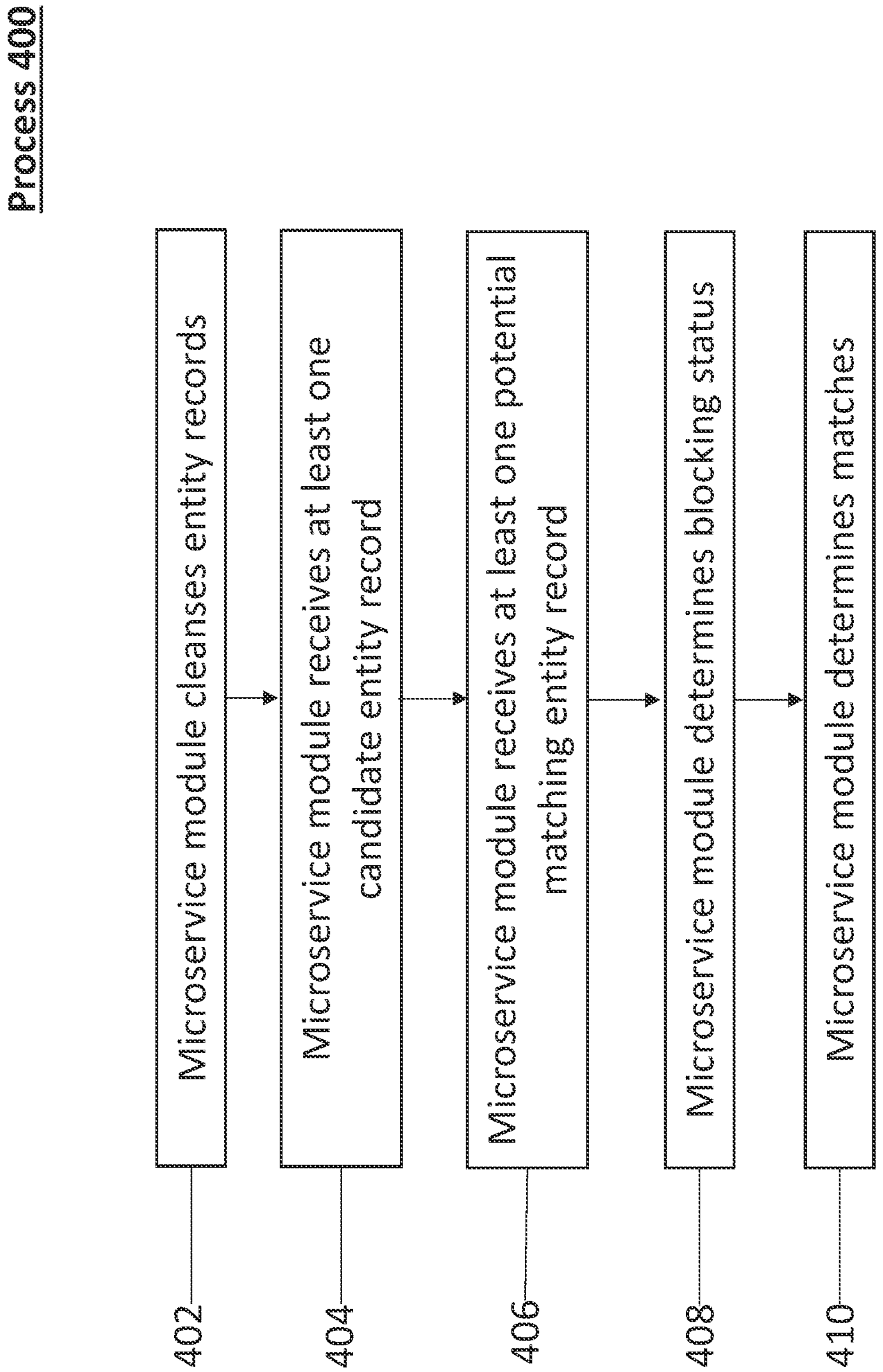
FIG. 4 is a flowchart illustrating operational steps of the exemplary computer-based system configured for cloud-first multifunction API cluster providing microservices capable of both batch and real-time processing of entity records in accordance with one or more embodiments of the present disclosure.

FIG. 4 is a flowchart illustrating operational steps of the exemplary computer-based system configured for cloud-first multifunction API cluster providing microservices capable of both batch and real-time processing of entity records in accordance with one or more embodiments of the present disclosure. In some embodiments, the illustrative microservices module 300 may implement a cluster of APIs, each associated with independent microservices that interoperate automatically to perform data processing tasks, such as, e.g., deduplication, data reconciliation, normalizing, pre-processing, among other tasks for any combination thereof. Thus, the illustrative microservices module 300 provides a modular, containerized processing environment without sacrificing an automated pipeline of operations within data processing tasks.

In some embodiments at Step 402, the illustrative microservices module 300 may utilize an API in the cluster operating a cleansing engine 314 to cleanse the at least one candidate entity records 212 and the at least one potential matching entity record. For example, in some embodiments, the entity records may be representative of one or more commercial entities, such as stores, corporations, merchants, service providers, among others or any combination thereof. The entity records for the commercial entities may include data items representative of details associated with the commercial entities. For example, the data items may be representative of, e.g., a business's legal name, an address of a store, headquarters or other place of business, a telephone number, a contact person, a merchant category code, among others or any combination thereof. Other entity records in other contexts may be employed so as to more efficiently search records, e.g., for deduplication, reconciliation, user search, among other database management tasks or any combination thereof. Indeed, the principles detailed herein are not limited to data records pertaining to entities, but rather may include data records representing one or more of any number of subjects, such as transaction records, electronic messages (e.g., emails, internet messaging or chat messages, SMS and/or MMS messages, among others or any combination thereof), or any other data records or any combination thereof.

In some embodiments the cleansing engine 314 may utilize the at least one processor(s) 309 to detect and remove duplicate entity records. In some embodiments, the cleansing engine 314 may generate a data table 200 with columns for, e.g., the cleansed name, cleansed zip code, cleansed city, state, or other fields and combinations thereof to construct a row for each cleansed record. The columns of each row may be used to generate a cleansed identifier (ID) by, e.g., forming a character string of the data of each column. Records may then be aggregated by, e.g., summing associated quantities, increasing a count number, or other aggregation technique, to combine duplicated cleansed IDs and reduce the number of records and standardize the format for further processing. In some embodiments the cleansing engine 314 may modify an entry of the data table 200 in a manner to improve information processing of the entity records for example, the cleansing engine 314 may pad or remove an entry, or it may generate a feature vector of an entry.

To generate the feature vector, the cleansing engine 314 may extract the data items of each candidate entity record and encode the data items in a corresponding feature vector. The data items may include, e.g., a business's legal name, an address of a store, headquarters or other place of business, a telephone number, a contact person, a merchant category code, among others or any combination thereof.

In some embodiments at Step 404 of Process 400 the illustrative microservices module 300 receives at least one candidate entity record 212 from a storage device 301. In some embodiments at Step 404, the illustrative microservice module 300 receives at least one potential matching entity record from a storage device 301. In some embodiments, the cleansing engine 314 produces an API request to a subsequent API of the illustrative microservices module 300 to implement a heuristic search API and associated microservice utilizing a particularly configured heuristic search to determine exact matches of feature vectors of the candidate entity record 212, or a fuzzy search may be utilized to determine potential matches. In some embodiments, the heuristic search API may be called separately from In some embodiments the illustrative microservices module 300 may determine a set of exact matches from the received potential matches and may generate a data table 200 including the candidate entity record 212 and the matching entity records for further processing.

In some embodiments, the illustrative microservice module 300 may be configured to implement an API and/or microservice for a blocking engine 316. In some embodiments at Step 404 the illustrative microservices module may utilize system status information from a containerization technology (e.g., Kubernetes) to determine the system status of a blocking engine 316. In some embodiments, at Step 406 the illustrative microservice module 300 may determine that a system status of a blocking engine 316 node(s) is at or near a capacity based on information from a containerization technology. In some embodiments the illustrative microservices module 300 may instantiate at least one second blocking engine upon receipt of a system status of a blocking engine 316 node(s) is in a range of 70-100% capacity. In some embodiments the illustrative microservice module 300 may be configured to instantiate at least one of an engine(s) (e.g., cleansing engine 314, blocking engine 316, feature engine 318, entity engine 320, display engine 322) based on a system status of a containerization technology, the system status information related to capacities of the node(s) managed by the containerization technology on which the respective engine(s) are operating. In some embodiments the illustrative microservice module 300 may utilize the blocking engine 316 to receive the pre-processed entity records and perform a search to determine at least one match of the at least one candidate entity records 212 from the database of entity records stored in a storage device 301.

In some embodiments at Step 408 the blocking engine 316 of the illustrative microservice module 300 may utilize a heuristic search to determine potential matches, the search based on characteristics of the candidate entity record 212 compared to the pre-processed entity records in the storage device 301. The illustrative microservice module 300 may utilize a minhash algorithm and/or other suitable blocking techniques or combinations thereof to determine at least one match of the pre-processed candidate entity records from the pre-processed entity records.

In some embodiments at Step 410 the illustrative microservice module 300 may utilize a heuristic search to determine potential matches, the search based on characteristics of the candidate entity record compared to the entity records in the storage device 301. The illustrative microservice module 300 may utilize a minhash algorithm and/or other suitable blocking techniques or combinations thereof (as detailed above) to determine at least one match of the pre-processed candidate entity records from the pre-processed entity records. Thus, the entity records may be blocked, e.g., for deduplication, to reduce the memory footprint of the entity records. In some embodiments, the blocking may be an initial rough grouping process for refinement via subsequent processes, or the blocking may be final grouping process before merging matching records, or any combination thereof.

Figure 5:
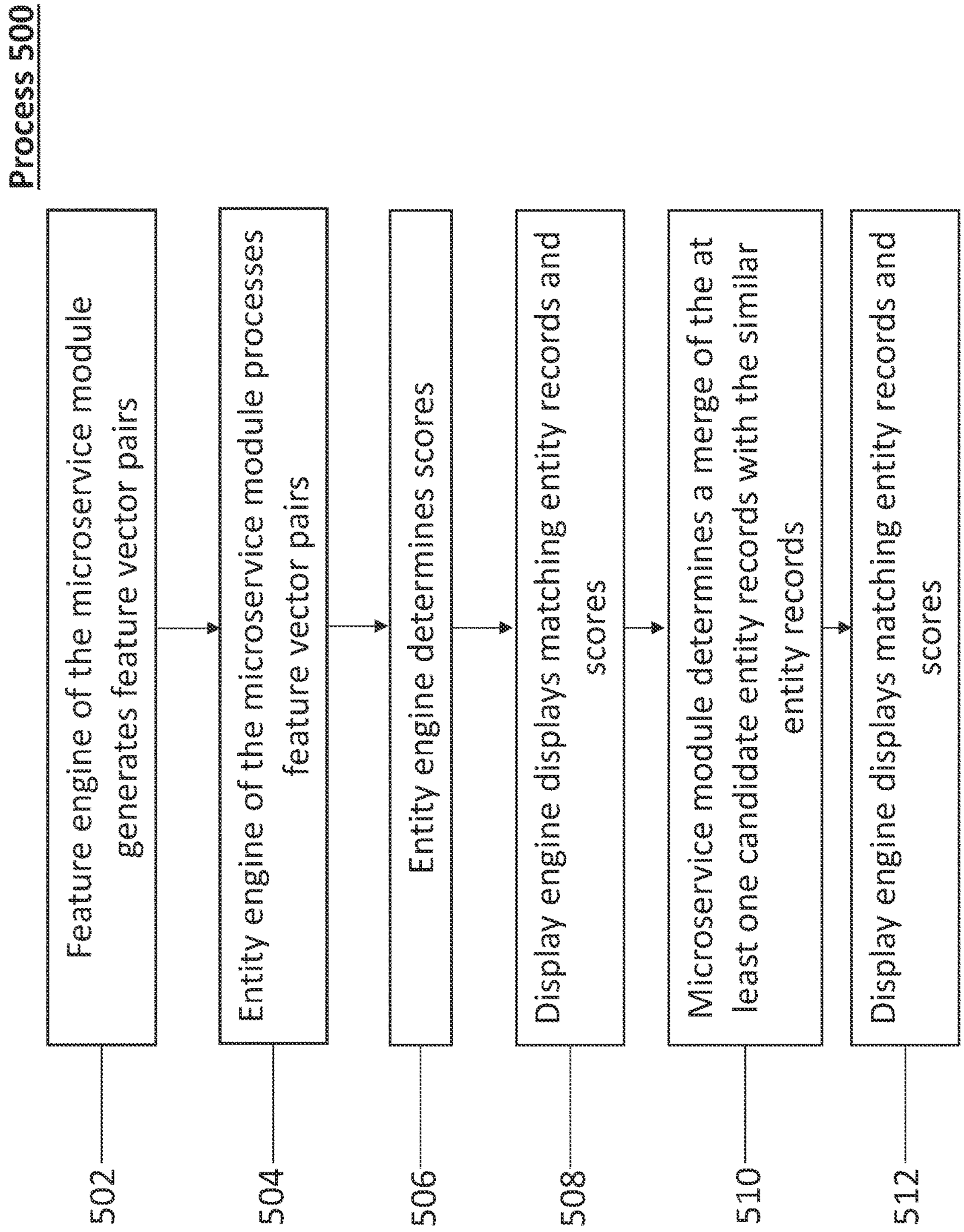
FIG. 5 is a flowchart illustrating operational steps of the exemplary computer-based system configured for cloud-first multifunction API cluster providing microservices capable of both batch and real-time processing of entity records in accordance with one or more embodiments of the present disclosure.

FIG. 5 is a flowchart illustrating operational steps of the exemplary computer-based system configured for cloud-first multifunction API cluster providing microservices capable of both batch and real-time processing of entity records in accordance with one or more embodiments of the present disclosure.

In some embodiments at Step 502 of Process 500 the illustrative microservices module 300 may utilize an API and/or microservice for at least one feature engine 318 to generate features of the at least one candidate entity record 212 and the at least one potentially matching entity records. For example, the instance module 200 may extract the data items of each candidate entity record and encode the data items in a corresponding feature vector. The data items may include, e.g., a business's legal name, an address of a store, headquarters or other place of business, a telephone number, a contact person, a merchant category code, among others or any combination thereof. The at least one feature engine 318 may be configured to generate features of the candidate entity record 212 and the potential matches of the entity records, and/or in some embodiments the at least one feature engine 318 may be configured to receive at least one potentially matching entity record from a storage device 301. In some embodiments the illustrative microservices module 300 may generate at least one pair of feature vectors of the at least one candidate entity records and the at least one entity records so that an entity engine 320 can determine a score of the at least one pair of feature vectors of the candidate entity record and the entity records. The at least one feature engine 318 may determine a quantitative representation of a similarity between a pair of feature vectors of the at least one candidate entity record 212 and at least one feature among the entity records.

In some embodiments, data entries may be matched according to a measure of similarity of individual or combinations of attributes represented in the data entries. In some embodiments, the measure of similarity may include, e.g., an exact match or a predetermined similarity score according to, e.g., Jaccard similarity, Jaro-Winkler similarity, Cosine similarity, Euclidean similarity, Overlap similarity, Pearson similarity, Approximate Nearest Neighbors, K-Nearest Neighbors, among other similarity measure. The predetermined similarity score may be any suitable similarity score according to the type of electronic activity to identify a measured attribute of any two data entries as the same.

In some embodiments, similarity may be measured between each individual attribute separately, and the respective similarity scores summed, averaged, or otherwise combined to produce a measure of similarity of two data entries. In some embodiments, the similarity may instead or in addition be measured for a combination of the device identifier, device type identifier and location identify. For example, a hash or group key may be generated by combining the device identifier, device type identifier and location identify. The hash may include a hash functioning take as input each of attribute or a subset of attributes of a particular data entry. The group key may be produced by creating a single string, list, or value from combining each of, e.g., a string, list or value representing each individual attribute of the particular data entry. The similarity between two data entries may then be measured as the similarity between the associated hashes and/or group keys. The measured similarity may then be compared against the predetermined similarity score to determine candidate data entries that are candidates as matching to each other.

In some embodiments at Step 504 the illustrative microservice module 300 may utilize an API and/or microservice of at least one entity engine 320 to process the feature vector candidate pairs determined by the at least one feature engine 318. In some embodiments the at least one entity engine 320 may utilize a machine learning model to process natural language and may be based on a deep machine learning architecture. The at least one entity engine 320 may be configured with at least one input layer, at least one hidden layer, and at least one output layer processing the pairs of feature vectors as inputs and by a numerical optimization of the connections and weights of the at least one hidden layer derives an output layer representing embeddings of the pairs of feature vectors of the input of entity records feature vectors. The at least one entity engine 320 is not limited to utilizing a deep machine learning algorithm architecture but may utilize any type of machine learning architecture such as a gradient boost, random forest, naïve bayes, support vector, decision tree, logistic regression, linear regression, or any similar type of architecture capable of determining embeddings of pairs of feature vectors of multiple entity records.

In some embodiments at Step 506 the at least one entity engine 320 of the illustrative microservices module 300 may be configured to determine a score of the pairs of entity records feature vectors in relation to the at least one candidate entity records feature vectors. In some embodiments the score may be determined by a distance measure such as Euclidean, Hamming, Pearson, Cosine and/or Jacquard, or any similar distance measure may be utilized. Thus, the at least one entity engine 320 may generate a quantification of the similarity each of the at least one candidate entity records based on the distance between the associated feature vectors, such as a distance between two entity records according to any one or more of, e.g., a business's legal name, an address of a store, headquarters or other place of business, a telephone number, a contact person, a merchant category code, among others or any combination thereof.

In some embodiments at Step 508 the illustrative microservice module 300 may utilize a display engine 322 to display on an output device interface 307 to a user 124 at least one candidate entity record, the matching entity records, scores, and associated statistics determined by the entity engine 320.

In some embodiments at Step 510 the illustrative microservices module 300 may utilize the at least one processor(s) 309 to determine a merge of the entity records with the at least one candidate entity record 212 based on the scores of the pairs, for example if the scores of the pairs exceed a threshold, then the illustrative microservices module 300 merges the entity records with the candidate entity record 212. In some embodiments the illustrative microservices module 300 may determine a merge of the entity records based on a high similarity threshold for example utilizing a distance measure such as Euclidian distance, hamming distance, Jacquard similarity or any other similar measure.

In some embodiments at Step 510 the illustrative microservices module 300 may utilize the at least one processor(s) 309 to generate clusters of records based on the candidate pairs and associated candidate pair scores that groups records. In some embodiments, a pre-determined rule determines a best match score threshold for the clusters of records, the pre-determined rule may be based on a correlation between scores of the entity record pairs, and/or it may be based on a correlation of a distance metric within each cluster. In some embodiments, the best match score threshold is predetermined, however, it may alternatively be user configurable or learned using, e.g., a trained threshold prediction model that, e.g., is trained to regressively predict score thresholds such as for example by a neural network model. In some embodiments, the candidate pair scores relate to a probability of a match. Thus, the higher the score, the greater the probability that the entities of the records are the same entity, such as for example a probability of a range between 70% and 100% may be high probability of a match, the entity records having a high probability of a matching being merged.

In some embodiments at Step 512 the illustrative microservices module 300 may utilize a display engine 322 to display on an output device interface 307 to a user 124 multiple merged candidate entity records and associated information such as statistics, attributes of at least one candidate entity record and the potential matches of entity records based on a score and user selection confidence intervals associated with multiple candidate entity records and the like.

Figure 6:
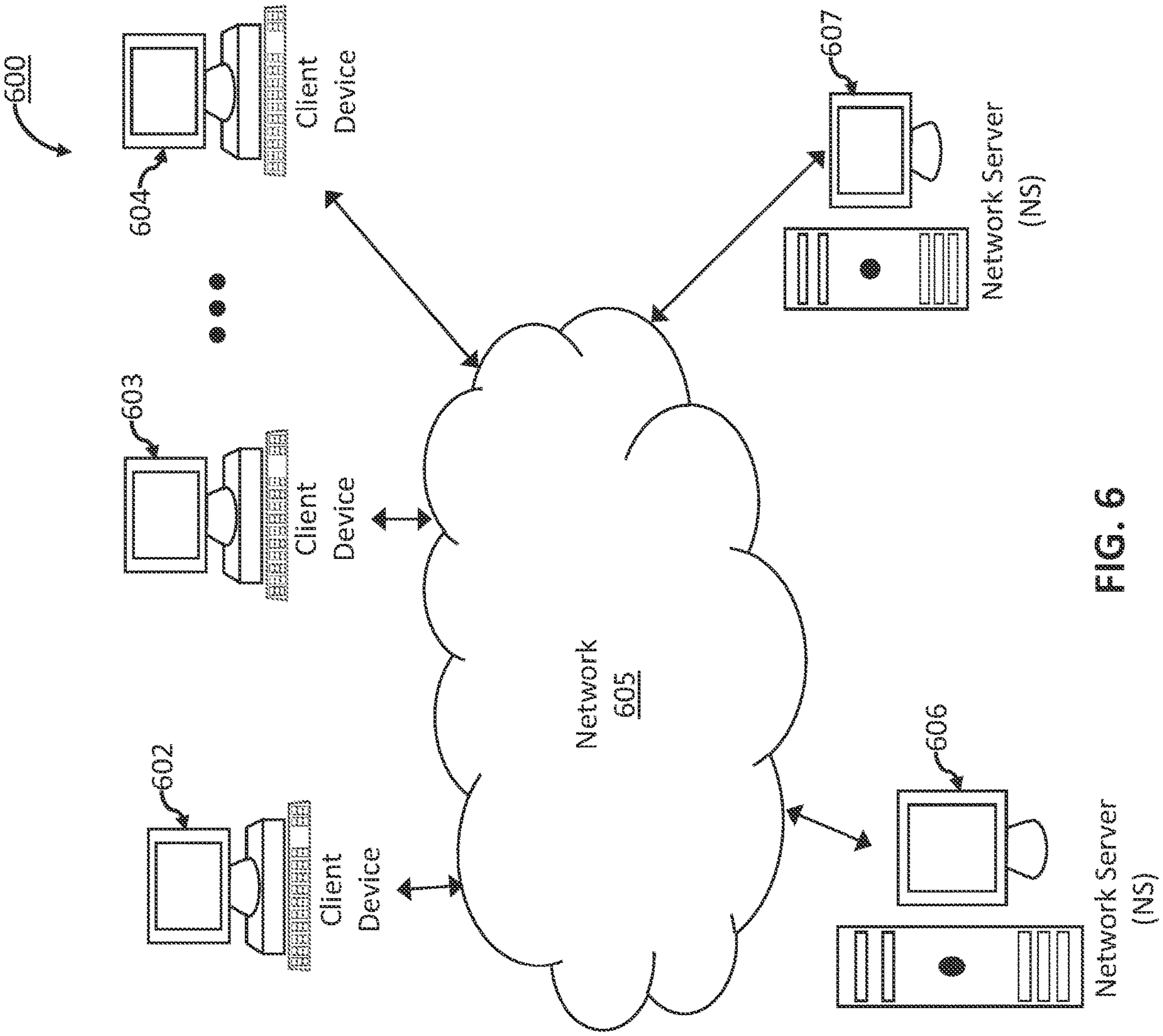
FIG. 6 depicts a block diagram of an exemplary computer-based system and platform 600 for resolving entity records in accordance with one or more embodiments of the present disclosure.

FIG. 6 depicts a block diagram of an exemplary computer-based system and platform 600 for resolving entity records in accordance with one or more embodiments of the present disclosure.

FIG. 6 depicts a block diagram of an exemplary computer-based system and platform 600 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 600 may be configured to manage a large number of members and concurrent transactions, as detailed herein. In some embodiments, the exemplary computer-based system and platform 600 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 6, client device 602, client device 603 through client device 604 (e.g., clients) of the exemplary computer-based system and platform 600 may include virtually any computing device capable of receiving and sending a message over a network (e.g., cloud network), such as network 605, to and from another computing device, such as servers 606 and 607, each other, and the like. In some embodiments, the client devices 602 through 604 may be personal computers, multiprocessor systems, microprocessor-based or programmable consumer electronics, network PCs, and the like. In some embodiments, one or more client devices within client devices 602 through 604 may include computing devices that typically connect using a wireless communications medium such as cell phones, smart phones, pagers, walkie talkies, radio frequency (RF) devices, infrared (IR) devices, CBs citizens band radio, integrated devices combining one or more of the preceding devices, or virtually any mobile computing device, and the like. In some embodiments, one or more client devices within client devices 602 through 604 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, OFDM, OFDMA, LTE, satellite, ZigBee, etc.). In some embodiments, one or more client devices within client devices 602 through 604 may include may run one or more applications, such as Internet browsers, mobile applications, voice calls, video games, videoconferencing, and email, among others. In some embodiments, one or more client devices within client devices 602 through 604 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a client device within client devices 602 through 604 may be specifically programmed by either Java, .Net, QT, C, C++, Python, PHP and/or other suitable programming language. In some embodiment of the device software, device control may be distributed between multiple standalone applications. In some embodiments, software components/applications can be updated and redeployed remotely as individual units or as a full software suite. In some embodiments, a client device may periodically report status or send alerts over text or email. In some embodiments, a client device may contain a data recorder which is remotely downloadable by the user using network protocols such as FTP, SSH, or other file transfer mechanisms. In some embodiments, a client device may provide several levels of user interface, for example, advance user, standard user. In some embodiments, one or more client devices within client devices 602 through 604 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 605 may provide network access, data transport and/or other services to any computing device coupled to it. In some embodiments, the exemplary network 605 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 605 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 605 may include and implement, as an alternative or in conjunction with one or more of the above, a WiMAX architecture defined by the WiMAX forum. In some embodiments and, optionally, in combination of any embodiment described above or below, the exemplary network 605 may include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 605 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, OFDM, OFDMA, LTE, satellite and any combination thereof. In some embodiments, the exemplary network 605 may include mass storage, such as network attached storage (NAS), a storage area network (SAN), a content delivery network (CDN) or other forms of computer or machine readable media.

In some embodiments, the exemplary server 606 or the exemplary server 607 may be a web server (or a series of servers) running a network operating system, examples of which may include but are not limited to Apache on Linux or Microsoft IIS (Internet Information Services). In some embodiments, the exemplary server 606 or the exemplary server 607 may be used for and/or provide cloud and/or network computing. Although not shown in FIG. 6, in some embodiments, the exemplary server 606 or the exemplary server 607 may have connections to external systems like email, SMS messaging, text messaging, ad content providers, etc. Any of the features of the exemplary server 606 may be implemented in the exemplary server 607 and vice versa.

In some embodiments, one or more of the exemplary servers 606 and 607 may be specifically programmed to perform, in non-limiting example, as authentication servers, search servers, email servers, social networking services servers, Short Message Service (SMS) servers, Instant Messaging (IM) servers, Multimedia Messaging Service (MMS) servers, exchange servers, photo-sharing services servers, advertisement providing servers, financial/banking-related services servers, travel services servers, or any similarly suitable service-base servers for users of the client devices 602 through 604.

In some embodiments and, optionally, in combination of any embodiment described above or below, for example, one or more exemplary computing client devices 602 through 604, the exemplary server 606, and/or the exemplary server 607 may include a specifically programmed software module that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect or functionality of various embodiments described herein can be performed in real-time and dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and linguistic relatives or derivatives, mean that certain events or actions can be triggered or occur without any human intervention. In some embodiments, events or actions in accordance with the present disclosure can be in real-time or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, illustrative, specially programmed computing systems with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when multiple NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component or a combination of at least one software component and at least one hardware component which are designed, programmed or configured to manage or control other software and hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and computing software languages (e.g., C++, Objective-C, Swift, Java, JavaScript, Python, Perl, QT, etc.).

In some embodiments, one or more of illustrative computer-based systems of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of illustrative computer-based systems of the present disclosure may obtain, manipulate, transfer, store, transform, generate, or output any digital object or data unit (e.g., from inside or outside of a particular application) that can be in any suitable form such as, without limitation, a file, a contact, a task, an email, a tweet, a map, an entire application (e.g., a calculator), etc. In some embodiments, as detailed herein, one or more of illustrative computer-based systems of the present disclosure may be implemented across one or more of various computer platforms such as, but not limited to: (1) AmigaOS, AmigaOS 4, (2) FreeBSD, NetBSD, OpenBSD, (3) Linux, (4) Microsoft Windows, (5) OpenVMS, (6) OS X (Mac OS), (7) OS/2, (8) Solaris, (9) Tru64 UNIX, (10) VM, (11) Android, (12) Bada, (13) BlackBerry OS, (14) Firefox OS, (15) iOS, (16) Embedded Linux, (17) Palm OS, (18) Symbian, (19) Tizen, (20) WebOS, (21) Windows Mobile, (22) Windows Phone, (23) Adobe AIR, (24) Adobe Flash, (25) Adobe Shockwave, (26) Binary Runtime Environment for Wireless (BREW), (27) Cocoa (API), (28) Cocoa Touch, (29) Java Platforms, (30) JavaFX, (31) JavaFX Mobile, (32) Microsoft XNA, (33) Mono, (34) Mozilla Prism, XUL and XULRunner, (35).NET Framework, (36) Silverlight, (37) Open Web Platform, (38) Oracle Database, (39) Qt, (40) SAP NetWeaver, (41) Smartface, (42) Vexi, and (43) Windows Runtime.

In some embodiments, illustrative computer-based systems of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, illustrative software specifically programmed in accordance with one or more principles of the present disclosure may be downloadable from a network, for example, a website, as a stand-alone product or as an add-in package for installation in an existing software application. For example, illustrative software specifically programmed in accordance with one or more principles of the present disclosure may also be available as a client-server software application, or as a web-enabled software application. For example, illustrative software specifically programmed in accordance with one or more principles of the present disclosure may also be embodied as a software package installed on a hardware device.

In some embodiments, illustrative computer-based systems of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000

(e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems of the present disclosure may be configured to be utilized in various applications which may include, but not limited to, gaming, mobile-device games, video chats, video conferences, live video streaming, video streaming and augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, the terms "proximity detection," "locating," "location data," "location information," and "location tracking" refer to any form of location tracking technology or locating method that can be used to provide a location of, for example, a particular computing device or system of the present disclosure and any associated computing devices, based at least in part on one or more of the following techniques and devices, without limitation: accelerometer(s), gyroscope(s), Global Positioning Systems (GPS); GPS accessed using Bluetooth™; GPS accessed using any reasonable form of wireless and non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems of the present disclosure may be configured to securely store or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTRO, SHA-1, SHA-2, Tiger (TTH), WHIRLPOOL, RNGs).

In some embodiments, the term "container" refers to an entire runtime environment: an application, plus all its dependencies, libraries and other binaries, and configuration files needed to run the application, bundled into one package. By containerizing the application platform and its dependencies, differences in OS distributions and underlying infrastructure are abstracted away.

The aforementioned examples are, of course, illustrative and not restrictive.

At least some aspects of the present disclosure will now be described with reference to the following numbered clauses.

Clause 1. A computer-implemented method comprising: receiving, by at least one processor, at least one entity records, the at least one entity records stored in an elastic search environment, the at least one entity records associated with at least one candidate entity record; utilizing, by the at least one processor, in real time, a microservice module capable of leveraging a containerization technology in a cloud-first computer-implemented real-time scalable processing cluster to determine a score of a match of each candidate entity pair, each candidate entity pair comprising: at least 20,000 entity records of the at least one entity records and the at least one candidate entity record; wherein the microservice module monitoring the cloud-first computer-implemented real-time scalable processing cluster is configured to: utilize a cleansing engine to cleanse the at least one candidate entity record; determine a status of a blocking engine, the status representing a processing load associated with the blocking engine; utilize a least one blocking engine to determine potential matches to the at least one candidate entity record from the at least one entity records; utilize at least one feature engine to generate the candidate entity pairs from the at least one candidate entity records and the potential matches; utilize at least one machine learning engine to determine the score of each candidate entity pair; display a score representing the at least one candidate entity record and the potential matches determined by the at least one machine learning engine; and merge the at least one candidate entity record and the potential matches based on the score and a user selection.

Clause 2. The computer-implemented method of clause 1, wherein the microservice module instantiates at least one second blocking engine based at least in part on a system status.

Clause 3. The computer-implemented method of clause 1, wherein the microservice module instantiates at least one second blocking engine based at least in part on a system status and the status of the blocking engine exceeds a threshold.

Clause 4. The computer-implemented method of clause 1, wherein the microservice module instantiates at least one second feature engine based at least in part on a system status.

Clause 5. The computer-implemented method of clause 1, wherein the microservice module instantiates at least one second machine learning engine based at least in part on a system status.

Clause 6. The computer-implemented method of clause 1, wherein the microservice module instantiates at least one second blocking engine and at least one feature engine based at least in part on a system status.

Clause 7. A system comprising: a non-transient computer memory, storing software instructions; and a least one processor of a first computing devices associated with a user; wherein, then at least one processor executes the software instructions, the first computing device is programmed to: receive, by at least one processor, at least one entity records, the at least one entity records stored in an elastic search environment, the at least one entity records associated with at least one candidate entity record; utilize, by the at least one processor, in real time, a microservice module capable of leveraging a containerization technology in a cloud-first computer-implemented real-time scalable processing cluster to determine a score of a match of each candidate entity pair, each candidate entity pair comprising: at least 20,000 entity records of the at least one entity records and the at least one candidate entity record; wherein the microservice module monitoring the cloud-first computer-implemented real-time scalable processing cluster is configured to: utilize a cleansing engine to cleanse the at least one candidate entity record; determine a status of a blocking engine, the status representing a processing load associated with the blocking engine; utilize at least one blocking engine to determine potential matches to the at least one candidate entity record from the at least one entity records; utilize at least one feature engine to generate the candidate entity pairs from the at least one candidate entity records and the potential matches; utilize at least one machine learning engine to determine the score of each candidate entity pair; display a score representing the at least one candidate entity record and the potential matches determined by the at least one machine learning engine; and merge the at least one candidate entity record and the potential matches based on the score and a user selection.

Clause 8. The system of clause 1, wherein the microservice module instantiates at least one second blocking engine based at least in part on a system status.

Clause 9. The system of clause 1, wherein the microservice module instantiates at least one second blocking engine based at least in part on a system status and the status of the blocking engine exceeds a threshold.

Clause 10. The system of clause 1, wherein the microservice module instantiates at least one second feature engine based at least in part on a system status.

Clause 11. The system of clause 1, wherein the microservice module instantiates at least one second machine learning engine based at least in part on a system status.

Clause 12. The system of clause 1, wherein the microservice module instantiates at least one second blocking engine and at least one feature engine based at least in part on a system status.

Clause 13. At least one computer-readable storage medium having encoded thereon software instructions that, when executed by at least one processor, cause the at least one processor to perform steps to: receive, by at least one processor, at least one entity records, the at least one entity records stored in an elastic search environment, the at least one entity records associated with at least one candidate entity record; utilize, by the at least one processor, in real time, a microservice module capable of leveraging a containerization technology in a cloud-first computer-implemented real-time scalable processing cluster to determine a score of a match of each candidate entity pair, each candidate entity pair comprising: at least 20,000 entity records of the at least one entity records and the at least one candidate entity record; wherein the microservice module monitoring the cloud-first computer-implemented real-time scalable processing cluster is configured to: utilize a cleansing engine to cleanse the at least one candidate entity record; determine a status of a blocking engine, the status representing a processing load associated with the blocking engine; utilize at least one blocking engine to determine potential matches to the at least one candidate entity record from the at least one entity records; utilize at least one feature engine to generate the candidate entity pairs from the at least one candidate entity records and the potential matches; utilize at least one machine learning engine to determine the score of each candidate entity pair; display a score representing the at least one candidate entity record and the potential matches determined by the at least one machine learning engine; and merge the at least one candidate entity record and the potential matches based on the score and a user selection.

Clause 14. The system of clause 1, wherein the microservice module instantiates at least one second blocking engine based at least in part on a system status.

Clause 15. The system of clause 1, wherein the microservice module instantiates at least one second blocking engine based at least in part on a system status and the status of the blocking engine exceeds a threshold.

Clause 16. The at least one computer-readable storage medium of clause 1, wherein the microservice module instantiates at least one second feature engine based at least in part on a system status.

Clause 17. The at least one computer-readable storage medium of clause 1, wherein the microservice module instantiates at least one second machine learning engine based at least in part on a system status.

Clause 18. The at least one computer-readable storage medium of clause 1, wherein the microservice module instantiates at least one second blocking engine and at least one feature engine based at least in part on a system status.

Clause 19. The at least one computer-readable storage medium of clause 1, wherein the microservice module combines the at least one blocking engine with the at least one second blocking engine based at least in part on a status of the at least one blocking engine.

Clause 20. The at least one computer-readable storage medium of clause 1, wherein the microservice module combines the at least one blocking engine with the at least one second blocking engine based at least in part on a system status.

As used herein, the term "user" shall have a meaning of at least one user. In some embodiments, the terms "user", "subscriber" "consumer" or "customer" should be understood to refer to a user of an application or applications as described herein, and a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

The invention claimed is:

1. A computer-implemented method comprising:
receiving, by at least one processor, a plurality of entity records, the plurality of entity records stored in an elastic search environment, the plurality of entity records associated with at least one candidate entity record;
utilizing, by the at least one processor, in real time, a microservice module capable of leveraging a containerization technology in a cloud-first computer-implemented real-time scalable processing cluster to determine a match of each candidate entity pair, each candidate entity pair comprising:
at least 20,000 entity records of the plurality of entity records and
the at least one candidate entity record;
wherein the microservice module monitoring the cloud-first computer-implemented real-time scalable processing cluster is configured to:
utilize a cleansing engine to cleanse the at least one candidate entity record;
determine a status of a blocking engine, the status representing a processing load associated with the blocking engine;
utilize, responsive to the status of the blocking engine, the blocking engine to determine candidate entity pairs representing potential matches to the at least one candidate entity record from the plurality of entity records;
utilize at least one feature engine to generate candidate entity pair features for each of the candidate entity pairs from the blocking engine based at least in part on the at least one candidate entity records and the potential matches;
utilize at least one machine learning engine to determine a similarity score of each candidate entity pair from the blocking engine based at least in part on the candidate entity pair features of each candidate entity pair produced by the blocking engine;
display the similarity score representing the at least one candidate entity record;
determine at least one identified matching pair from the candidate entity pairs based at least in part on the similarity score of each candidate entity pair; and
merge the at least one candidate entity record and the potential matches of the at least one identified match based on the similarity score and a user selection.

2. The computer-implemented method of claim 1, wherein the microservice module instantiates at least one second blocking engine based at least in part on a system status.

3. The computer-implemented method of claim 1, wherein the microservice module instantiates at least one second blocking engine based at least in part on a system status and the status of the blocking engine exceeds a threshold.

4. The computer-implemented method of claim 1, wherein the microservice module instantiates at least one second feature engine based at least in part on a system status.

5. The computer-implemented method of claim 1, wherein the microservice module instantiates at least one second machine learning engine based at least in part on a system status.

6. The computer-implemented method of claim 1, wherein the microservice module instantiates at least one second blocking engine and at least one feature engine based at least in part on a system status.

7. At least one non-transitory computer-readable storage medium having encoded thereon software instructions that, when executed by at least one processor, cause the at least one processor to perform steps to:
receive, by at least one processor, a plurality of entity records, the plurality of entity records stored in an elastic search environment, the plurality of entity records associated with at least one candidate entity record;
utilize, by the at least one processor, in real time, a microservice module capable of leveraging a containerization technology in a cloud-first computer-implemented real-time scalable processing cluster to determine a match of each candidate entity pair, each candidate entity pair comprising:
at least 20,000 entity records of the plurality of entity records and
the at least one candidate entity record;
wherein the microservice module monitoring the cloud-first computer-implemented real-time scalable processing cluster is configured to:
utilize a cleansing engine to cleanse the at least one candidate entity record;
determine a status of a blocking engine, the status representing a processing load associated with the blocking engine;
utilize, responsive to the status of the blocking engine, the blocking engine to determine candidate entity pairs representing potential matches to the at least one candidate entity record from the plurality of entity records;
utilize at least one feature engine to generate candidate entity pair features for each of the candidate entity pairs from the blocking engine based at least in part on the at least one candidate entity records and the potential matches;
utilize at least one machine learning engine to determine a similarity score of each candidate entity pair from the blocking engine based at least in part on the candidate entity pair features of each candidate entity pair produced by the blocking engine;
display the similarity score representing the at least one candidate entity record;
determine at least one identified matching pair from the candidate entity pairs based at least in part on the similarity score of each candidate entity pair; and
merge the at least one candidate entity record and the potential matches of the at least one identified match based on the similarity score and a user selection.

8. The at least one non-transitory computer-readable storage medium of claim 7, wherein the microservice module instantiates at least one second blocking engine based at least in part on a system status.

9. The at least one non-transitory computer-readable storage medium of claim 7, wherein the microservice module instantiates at least one second blocking engine based at least in part on a system status and the status of the blocking engine exceeds a threshold.

10. The at least one non-transitory computer-readable storage medium of claim 7, wherein the microservice module instantiates at least one second feature engine based at least in part on a system status.

11. The at least one non-transitory computer-readable storage medium of claim 7, wherein the microservice module instantiates at least one second machine learning engine based at least in part on a system status.

12. The at least one non-transitory computer-readable storage medium of claim 7, wherein the microservice module instantiates at least one second blocking engine and at least one feature engine based at least in part on a system status.

13. The at least one non-transitory computer-readable storage medium of claim 7, wherein the microservice module combines the at least one blocking engine with at least one second blocking engine based at least in part on a status of the at least one blocking engine.

14. The at least one non-transitory computer-readable storage medium of claim 7, wherein the microservice module combines the at least one blocking engine with at least one second blocking engine based at least in part on a system status.

* * * * *